United States Patent
Frerichs et al.

(10) Patent No.: US 6,658,798 B1
(45) Date of Patent: Dec. 9, 2003

(54) FLOOR SLOT ROOM EXTENDER

(75) Inventors: Marc Edward Frerichs, Davenport, IA (US); Paul Edmund Hanser, Tipton, IA (US)

(73) Assignee: HWH Corporation, Moscow, IA (US)

( * ) Notice: Subject to any disclaimer, the term of this patent is extended or adjusted under 35 U.S.C. 154(b) by 0 days.

(21) Appl. No.: 09/682,938

(22) Filed: Nov. 1, 2001

(51) Int. Cl.[7] .................................................. E04B 1/36
(52) U.S. Cl. ............................ 52/67; 52/64; 296/26.13; 296/26.14; 296/171; 296/175
(58) Field of Search ..................... 52/64, 67; 296/26.13, 296/26.14, 171, 172–176, 26.12

(56) References Cited

U.S. PATENT DOCUMENTS

| | | | |
|---|---|---|---|
| 5,491,933 A | | 2/1996 | Miller et al. |
| 5,577,351 A | * | 11/1996 | Dewald, Jr. et al. ............. 52/67 |
| 5,758,918 A | * | 6/1998 | Schneider et al. ............. 296/26 |
| 5,894,698 A | * | 4/1999 | Dewald, Jr. et al. ............. 52/67 |
| 5,902,001 A | * | 5/1999 | Schneider ................. 296/26.13 |
| 5,997,074 A | * | 12/1999 | Alexander ................... 296/176 |
| 6,052,952 A | | 4/2000 | Frerichs et al. |
| 6,067,756 A | | 5/2000 | Frerichs et al. |
| 6,108,983 A | * | 8/2000 | Dewald, Jr. et al. ............. 52/67 |
| 6,293,611 B1 | * | 9/2001 | Schneider et al. ........... 296/171 |

* cited by examiner

*Primary Examiner*—Carl D. Friedman
*Assistant Examiner*—Yvonne M. Horton
(74) *Attorney, Agent, or Firm*—James C. Nemmers

(57) ABSTRACT

A space saving system to provide stable and supported movement of an expandable room or other moveable structure relative to a vehicle or other base structure is disclosed. The space saving system provides an inner and outer nested tubular member within a floor of the base structure. Low friction bearings are used to separate and support the nested tubular members relative to one another. The inner member is fixed to the base structure and the outer member is allowed to move telescopically relative to the inner member. The outer member is vertically supported by the base structure through use of a low friction bearing. The expandable room is supported upon the outer member.

8 Claims, 4 Drawing Sheets

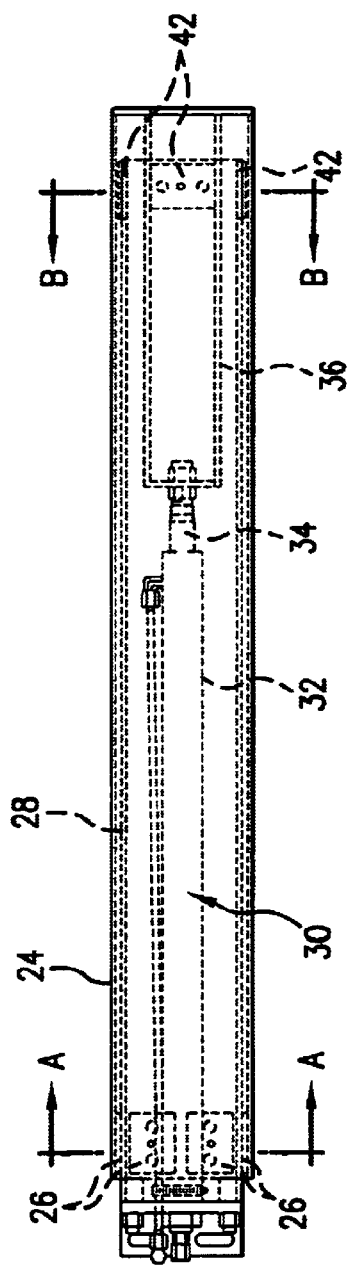
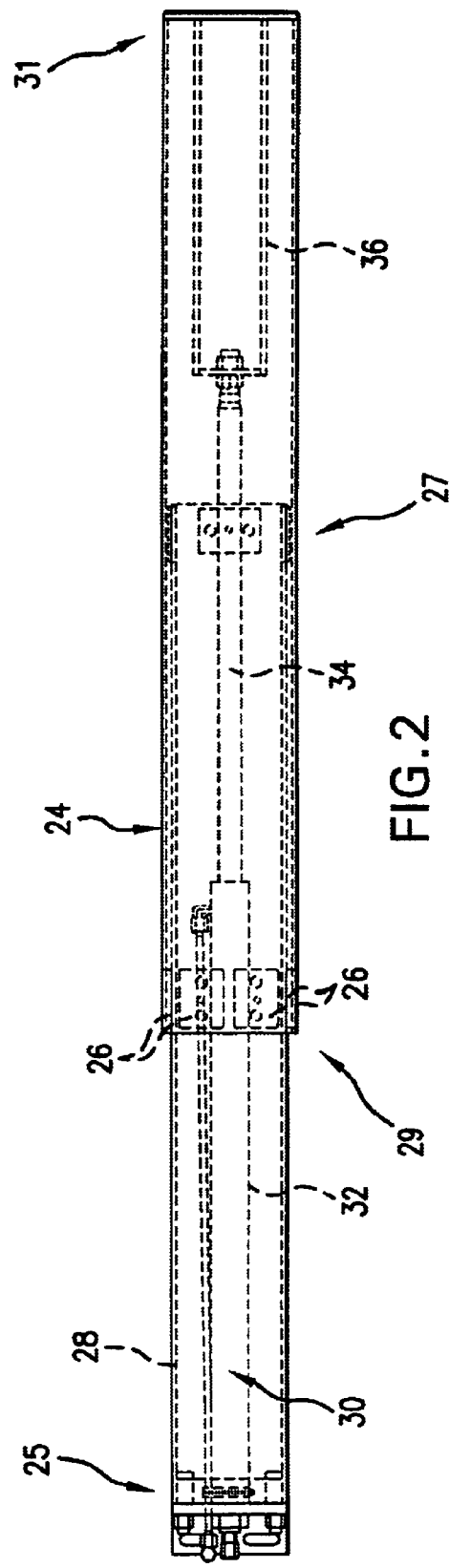
FIG. 1
FIG. 2

FLOOR SLOT ROOM EXTENDER

BACKGROUND OF INVENTION

The present invention relates generally to expandable rooms. More particularly, this invention relates to room portions that are telescopically slidable between retracted and expanded positions.

Various vehicles are known which have rooms or room portions that may be adjusted between expanded and retracted positions in order to provide more or less internal space as desired. Typically, one portion of the room is movable and telescopically received or nested within a portion of the room that remains fixed. When the vehicle is in motion, the moveable room portion typically remains in a retracted position. This arrangement provides adequate space to accommodate users in transit and yet remain within vehicle width limitations. When the vehicle is stopped for a length of time, however, it is often desirable to increase the size of internal accommodations. At that point, the user may slide the movable, nested portion of the room out to its expanded position.

These movable room portions usually include generally horizontal walls such as a floor and a roof as well as generally vertical walls such as a side wall and one or more end walls. In the retracted position, the roof, floor, and end walls are typically concealed from exterior view and the room side wall forms a portion of the vehicle side wall. At the same time, the floor of the movable portion of the room typically rests above the floor of the vehicle and may form a usable portion of the interior floor during vehicle transit. Similarly, the ceiling of the movable portion of the room may define the interior ceiling of that part of the vehicle during transit.

Room extenders common in the prior art have utilized folding, jointed structural arms. Such arms may fold and unfold in a plane perpendicular to the floor of the recreational vehicle or coach. For example, one version of such an extender utilizes folded arms hidden within built-in furniture such as the arm of a couch. Other extenders have included jointed structural arms that fold and unfold in a plane parallel to the floor of the extendable room and occupy a space between the beams that support the extendable room.

Additional designs have included telescopically extendable tubes or beams driven by rack and pinion mechanisms or hydraulic cylinders. Such designs have utilized multiple parallel tubes or beams to attain stability in the extended position and throughout room expansion. Such designs have traditionally demanded the use of under floor storage space to accommodate multiple tubes or beams as well as separate drive mechanisms. Alternatively, such designs have demanded use of above floor space.

Useable space is valuable in recreational vehicles, coaches and trailers. Because the vehicle must accommodate the nested, movable portion of the expandable room when the moveable portion is retracted, a portion of the available storage or occupancy space within the vehicle is necessarily occupied. Further use of vehicle space includes the use of under-floor storage space to accommodate the support structure and/or force assist members or elements that comprise the drive mechanisms for extending, supporting, and stabilizing the movable portion of the room. These space demands have led to creative interior design, including the placement of beds, cabinets, etc., and creative use of room control and driving mechanisms. However, there remains a need for support structures and slide-out room-driving mechanisms that allow the smooth and stable extension of the movable portion of such rooms while minimizing the amount of vehicle space occupied by drive mechanisms and the retracted room portion.

It is therefore the principal object of this invention to provide a space-saving room extender that allows smooth and stable extension of rooms with minimal use of valuable vehicle occupant or storage space.

SUMMARY OF INVENTION

The present invention is a space-saving room extender providing for the smooth and stable extension of the movable portion of an expandable room with a minimal loss of valuable vehicle space. A hydraulic cylinder mechanism is shown and preferred, but use of an electrical screw auger, other electrical actuation means, or other force assist elements or members may be employed. The invention further provides for room extension while minimizing the use of valuable interior and under floor space and while creating a room with a stable and solid feel while allowing a minimum of lateral (relative to the direction of extension and retraction) or vertical motion. The invention comprises a force assist element anchored to a support beam, structural tubing member or other structural element of a vehicle or trailer. The force assist element is contained within an interior, nested housing member that is anchored to a vehicle structural member. This interior member lies within an outer housing member that is slideable over the inner housing member. The expandable room is supported by and moveable with the outer housing member. The inner housing member is anchored by a vehicle member or other base structure member to provide vertical and lateral anchoring support. The outer housing member is vertically supported near the vehicle side wall. Preferably, low friction bearings hold the inner, nested housing member secure within the outer housing member such that vertical and lateral movement of the housings and the moveable room portion is minimized. Low friction bearings are also preferably used at the vertical support of the outer housing member. The housing members of the present invention are disposed in the floor of the vehicle. In this manner, a stable room extension is provided with minimum use of valuable vehicle space.

BRIEF DESCRIPTION OF DRAWINGS

FIG. 1 is a top view illustrating the retracted room expansion and retraction system with interior elements shown in dashed lines.

FIG. 2 is a top view illustrating the expanded room expansion and retraction with interior elements shown in dashed lines.

DETAILED DESCRIPTION

Figure 5:
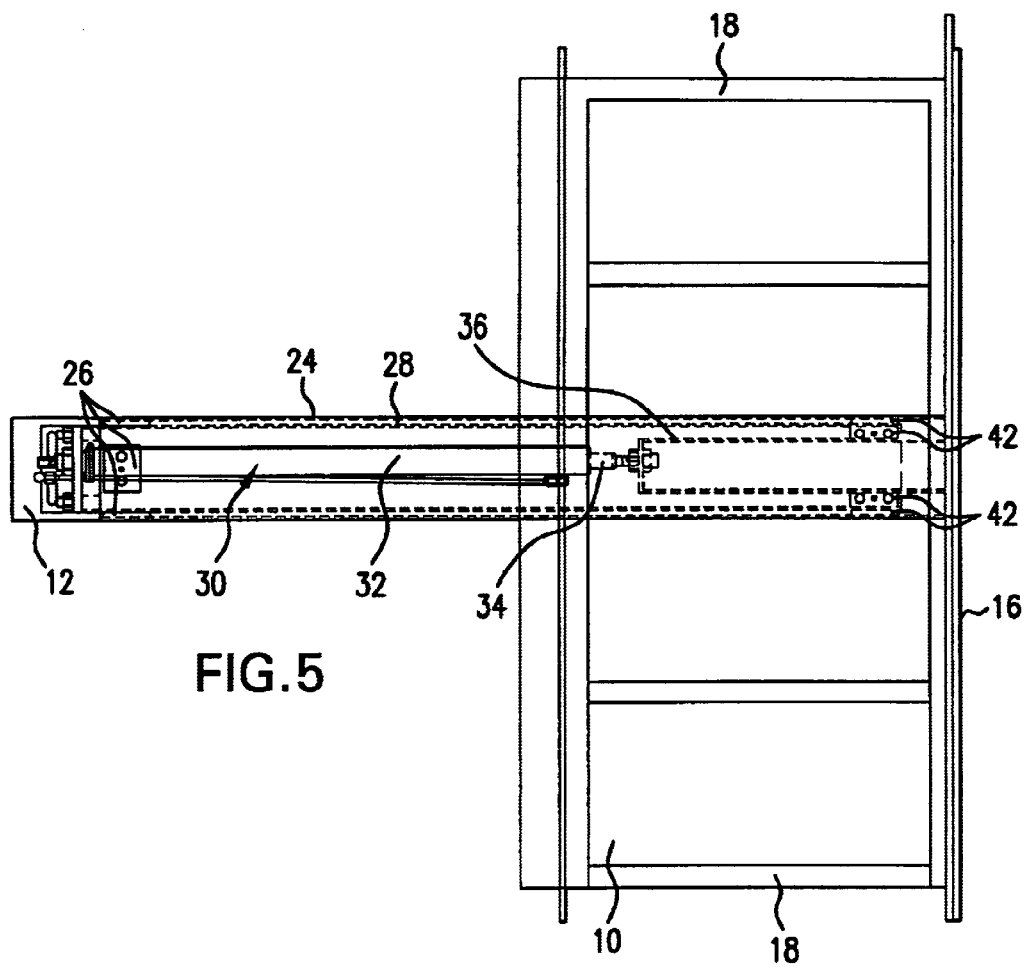
FIG. 5 is a top view of a retracted expandable room and expansion and retraction system with interior elements shown in dashed lines.
Figure 6:
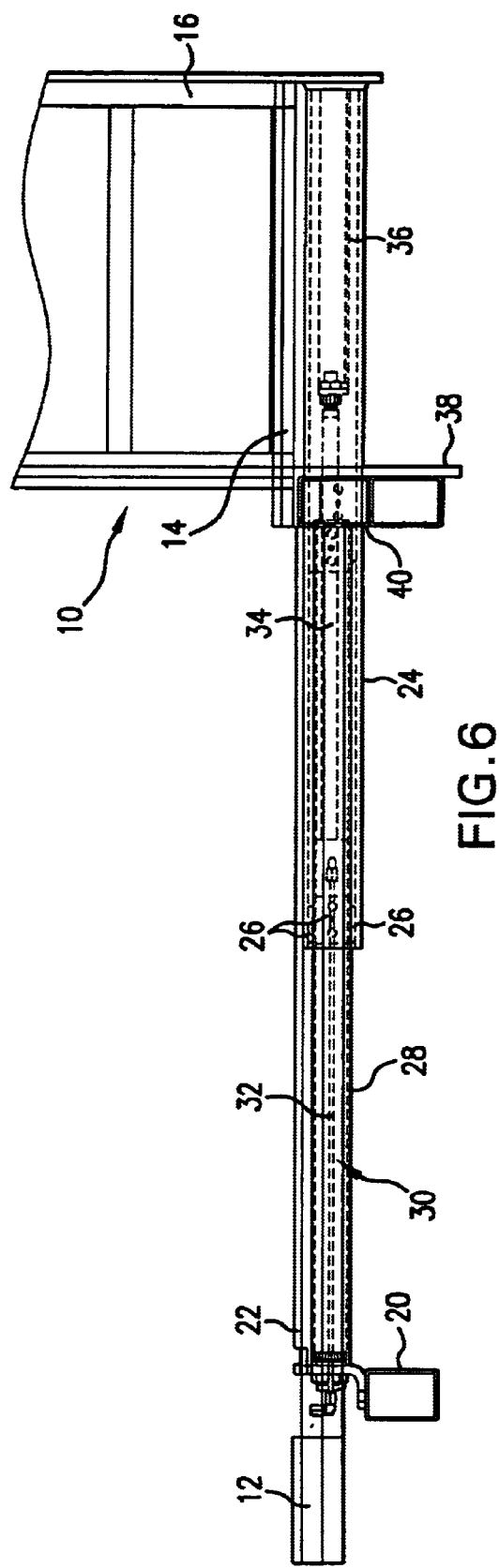
FIG. 6 is a side view of an expanded expandable room with expansion and retraction system and having interior elements shown in dashed lines.

As best illustrated in FIGS. 5 and 6, an expandable room 10 is moveable between a retracted position and an expanded position relative to a vehicle or other base structure 12. The expandable room comprises a plurality of walls typically including a floor 14, roof, side wall 16, and end walls 18. The vehicle, shown in FIGS. 5 and 6, illustrates a vehicle side wall 38, vehicle structural members 20 under a vehicle floor 22.

The vehicle floor 22 has a generally elongated opening or slot formed therein. There is disposed within the floor opening a moveable outer housing member 24 separated by outer housing bearings 26 from a nested, anchored inner housing member 28, which in turn, contains a hydraulic cylinder 30 or other force assist element such as a pneumatic system, electric drive, or manual force assist system. The inner and outer housing members 28, 24 are preferably box type tubular members having first 25, 29 and second 27, 31 ends respectively. The preferred force assist element, the hydraulic cylinder, comprises a hydraulic cylinder body 32 and extension rod 34. One end of the hydraulic cylinder is anchored with the inner housing 28 first end 25 to a vehicle structural member 20 and the opposite end of the hydraulic cylinder is anchored to an intermediate member 36 that is generally aligned with and moveable within the inner housing member 28. The outer housing member 24 is moveable about the inner housing member 28 along a longitudinal axis that is generally parallel and preferably co-linear with the longitudinal axis of the inner housing member 28. The intermediate member 36 is anchored to the outer housing member 24 at its end opposite the force assist element 30 such that movement of the force assist element 30 causes movement of the intermediate member 36 and attached outer housing member 24.

Figure 3:
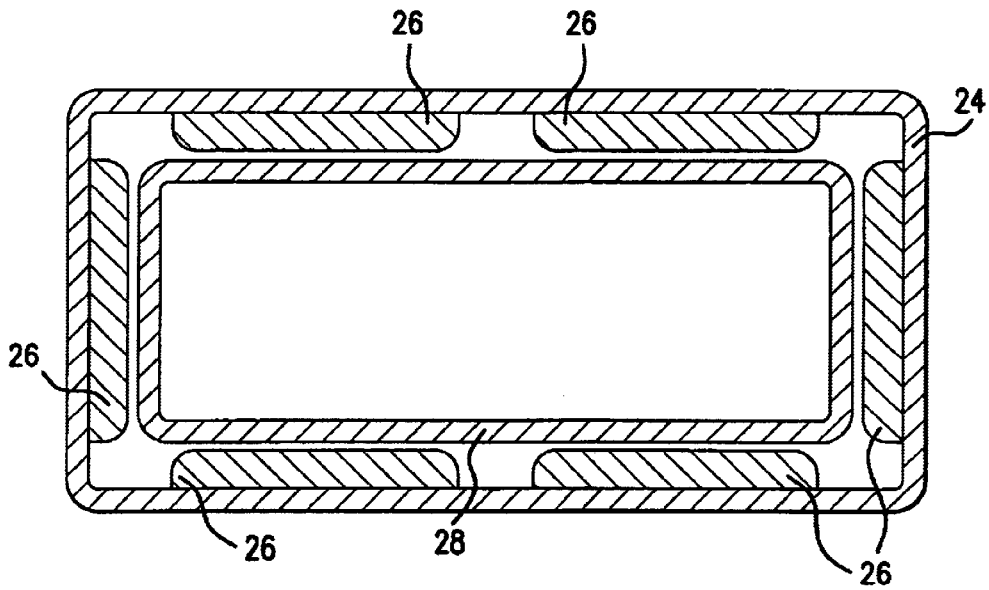
FIG. 3 is an end view at section AA of FIG. 1 showing the inner and outer housing members separated by outer housing member bearings.
Figure 4:
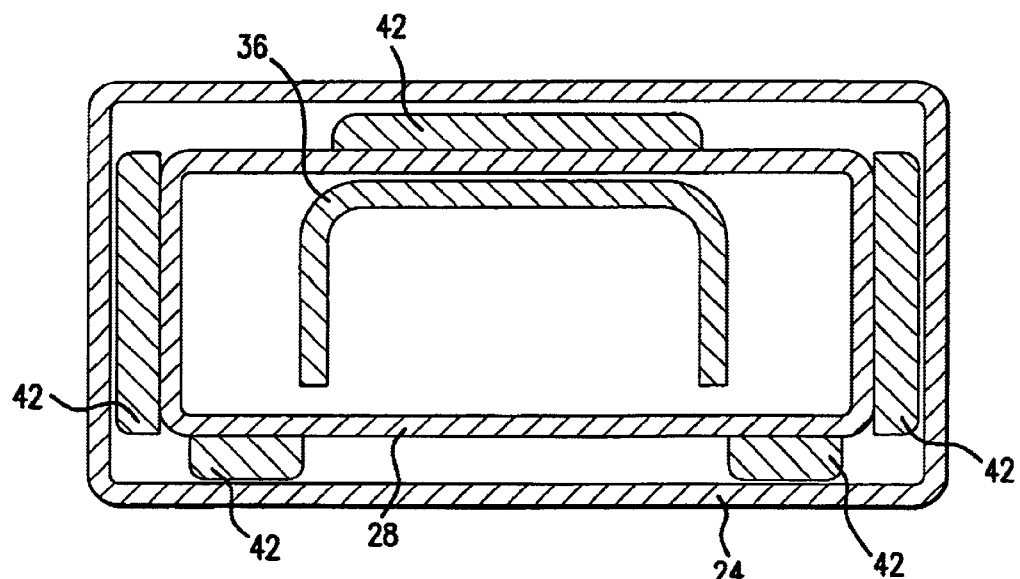
FIG. 4 is an end view at section BB of FIG. 1 showing the inner and outer housing members separated by inner housing member bearings and surrounding the expansion member.

The outer housing member 24 second end 31 is attached to the extendable room or room portion 10 near the room portion side wall 16. Preferably the outer housing member 24 is attached to the floor or wall bottom members 14 of the extendible room 10 along the depth of the extendible room 10, and the outer housing member 24 rides upon vertical support bearings 40 that are mounted on the vehicle members 20 such as beams or structural tubing generally near the vehicle side wall 38. These vertical support bearings 40 are preferably of a durable plastic construction. In this manner, the outer housing member 24 is supported from below by the vertical support bearings 40 upon the vehicle structure 20. The outer housing member 24 is constrained against rotation about the vertical support bearings 40 by the outer housing member's 24 position about the anchored, inner housing 28 and by contact with the inner housing member 28 through bearings (the outer housing member bearings 26 and the inner housing member bearings 42) at two separate support points (as illustrated in FIGS. 3 and 4 which represent cross sectional views illustrated at sections AA and BB, respectively, from FIG. 1). In addition to the torque resistance just described, because the expandable room is preferably supported by the outer housing member 24 along the expandable room's entire depth, the vertical load of the expandable room is distributed along the outer housing member 24 and not directed solely through the outer housing member 24 at only one or more selected support points. Additional vertical support bearings 40 are provided between the vehicle members 20 and the expandable room floor 14 generally near the expandable room end walls 18.

In this manner, the nested, hydraulically driven expandable room accomplishes the objects of the invention. Namely, the mechanism provides a stable (vertically and laterally) extendible room with a simple drive or force assist element or member, without the need to breach the structural integrity of the underlying vehicle, and with a minimum of space occupied within the vehicle and under the vehicle floor. Through placement of the inner and outer housing members 28, 24 and the force assist element 30 in the floor 22, storage and occupancy space are conserved.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included within the scope of the following claims.

What is claimed is:

1. A space-saving system for moving and supporting an expandable room that is telescopically moveable from within a base structure, the system comprising:

a base structure having a floor therein;

an inner housing member having a first end, a second end, and a longitudinal axis, the inner housing member being anchored to the base structure generally near the inner housing member first end and substantially within the base structure floor;

an outer housing member having a first end and a second end, the outer housing member having a generally longitudinal opening formed therein for receiving the inner housing member, the outer housing member being moveable about the inner housing member generally along the inner housing member longitudinal axis;

an expandable room being anchored to the outer housing member;

a plurality of housing member bearings being disposed within the outer housing member generally longitudinal opening between the inner housing member and the outer housing member, a first of the housing member bearings being disposed generally near the outer housing member first end and a second of the housing member bearings being disposed generally near the inner housing member second end, said bearings providing for the transfer of loads between the inner and outer housing members at selected locations intermediate the inner housing member first end and the outer housing member second end;

a hydraulic cylinder having a hydraulic cylinder body and a hydraulic cylinder extension rod, the hydraulic cylinder body being moveable a selected distance relative to the hydraulic cylinder extension rod, the hydraulic cylinder being disposed generally in alignment with the inner housing member longitudinal axis, the hydraulic cylinder body being anchored within the inner housing member generally near the inner housing member first end and the hydraulic cylinder extension rod having an exterior end being extendible and retractable from the hydraulic cylinder body and being anchored generally near the outer housing member second end;

an intermediate member anchored with the outer housing member generally near the outer housing member second end;

the hydraulic cylinder extension rod exterior end being anchored to the intermediate member; and a vertical support anchored to the base structure, the vertical support moveably engaging the outer housing member.

2. The system of claim 1 wherein the plurality of housing member bearings provide support between the inner and outer housing members above and below the inner housing member.

3. A system for moving a mobile wall relative to a fixed wall, the system comprising:

a base structure;

a fixed horizontal wall supported generally above the base structure and having an elongated opening formed therein;

the elongated opening receiving telescopically nested inner and outer housing members the outer housing member being moveably combined with and receiving vertical support from the base structure, and being anchored to the moveable wall, the inner housing member being anchored to the base structure;

a force assist element being coaxially disposed in combination with the inner and outer housing members upon a longitudinal axis to actuate movement of the outer housing member relative to the inner housing member;

an intermediate arm extending within the outer housing member generally along the longitudinal axis and being combined with the force assist element; and wherein housing member bearings disposed between the inner and outer housing members provide for the transfer of vertical loads between the housing members above and below the inner housing member.

4. The system of claim 3 wherein the inner and outer housing members are maintained in spaced relationship relative to one another by the housing bearings.

5. The system of claim 4 wherein the housing bearings are low friction plastic bearings.

6. The system of claim 3 wherein the outer housing member is supported by a vertical support bearing that is disposed upon the base structure.

7. The system of claim 3 wherein the inner and outer housing members are tubular members.

8. The system of claim 3 wherein the fixed wall is a vehicle interior floor and the mobile wall is an expandable room floor.

* * * * *